United States Patent
Shingu et al.

(10) Patent No.: US 7,705,875 B2
(45) Date of Patent: Apr. 27, 2010

(54) DISPLAY DEVICE, SYSTEM, DISPLAY METHOD, AND STORAGE MEDIUM STORING ITS PROGRAM

(75) Inventors: Jun Shingu, Kanagawa (JP); Jun Miyazaki, Kanagawa (JP); Toshiya Yamada, Kanagawa (JP); Kazutaka Hirata, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1562 days.

(21) Appl. No.: 10/989,042

(22) Filed: Nov. 16, 2004

(65) Prior Publication Data
US 2005/0275715 A1 Dec. 15, 2005

(30) Foreign Application Priority Data
Jun. 11, 2004 (JP) ............................... 2004-174858

(51) Int. Cl.
*H04N 7/14* (2006.01)
*G06F 15/16* (2006.01)

(52) U.S. Cl. .............. 348/14.07; 348/14.08; 348/14.09; 348/14.1

(58) Field of Classification Search ... 348/14.01–14.09, 348/14.1, 14.11–14.16; 707/200; 714/201, 714/255; 345/501; 709/204–205
See application file for complete search history.

(56) References Cited

U.S. PATENT DOCUMENTS

| | | | | |
|---|---|---|---|---|
| 5,572,728 A | * | 11/1996 | Tada et al. | 707/200 |
| 5,945,976 A | * | 8/1999 | Iwamura et al. | 345/419 |
| 6,304,283 B1 | * | 10/2001 | Kitagawa | 348/14.06 |
| 6,608,636 B1 | * | 8/2003 | Roseman | 715/753 |
| 6,707,454 B1 | * | 3/2004 | Barg et al. | 345/440 |
| 7,167,898 B2 | * | 1/2007 | Sato et al. | 709/204 |
| 7,185,054 B1 | * | 2/2007 | Ludwig et al. | 709/204 |
| 7,231,423 B1 | * | 6/2007 | Horstmann et al. | 709/204 |
| 2002/0093583 A1 | * | 7/2002 | Ito | 348/373 |
| 2004/0114541 A1 | * | 6/2004 | Caspi et al. | 370/260 |
| 2005/0018828 A1 | * | 1/2005 | Nierhaus et al. | 379/202.01 |

FOREIGN PATENT DOCUMENTS

| | | | |
|---|---|---|---|
| JP | 2000-125274 | * | 4/2000 |
| JP | 2001-318175 A | | 11/2001 |
| JP | 2003-87725 A | | 3/2003 |

* cited by examiner

*Primary Examiner*—Melur Ramakrishnaiah
(74) *Attorney, Agent, or Firm*—Sughrue Mion, PLLC

(57) ABSTRACT

A display device comprising includes an acquiring unit and a display unit. The acquiring unit acquires information about a conference from a storage device that stores conference information. The display unit creates an icon being representative of a feature of the conference and also a table, and displays the icon on the table corresponding to the conference. The display unit creates the icon and the table based on the information acquired by the acquiring unit.

27 Claims, 13 Drawing Sheets

F I G. 4
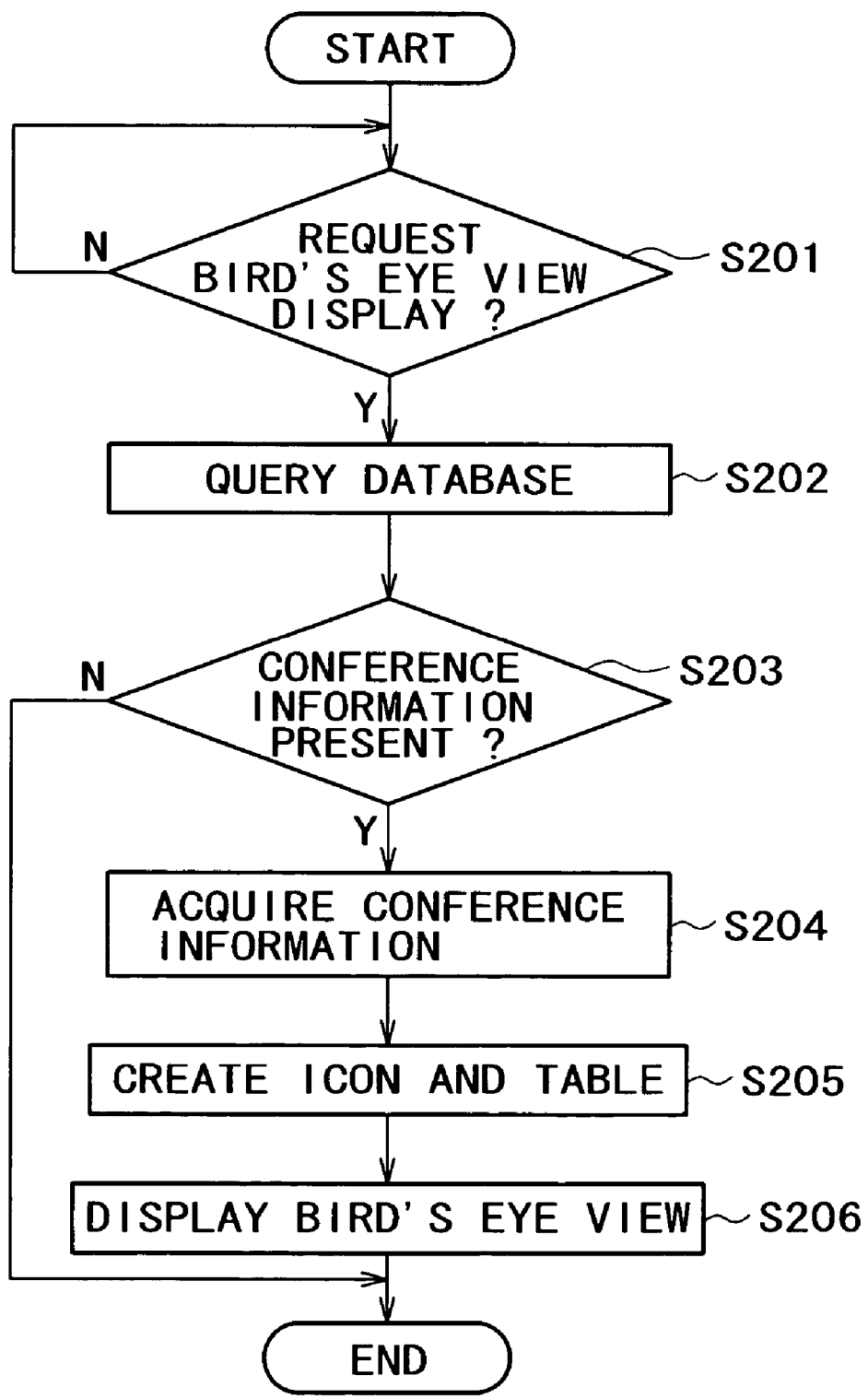

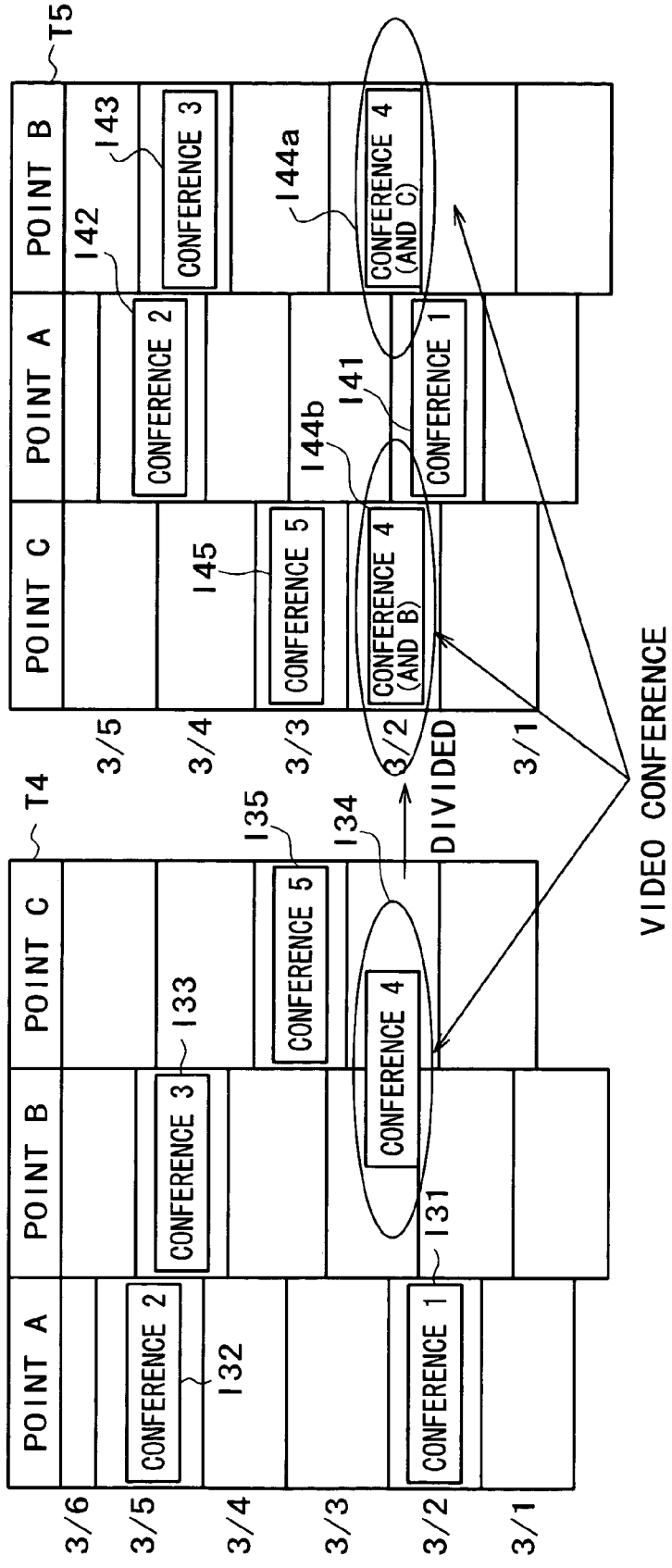

F I G. 1 1 B

CONFERENCE INFORMATION BIRD'S EYE VIEW B7

| POINT C | POINT B | POINT D |
|---------|---------|---------|

T7

↑ N SECONDS LATER

F I G. 1 1 A

CONFERENCE INFORMATION BIRD'S EYE VIEW B7

| POINT A | POINT B | POINT C |
|---------|---------|---------|

T7

CONFERENCE INFORMATION BIRD'S EYE VIEW B9

BACKGROUND COLOR
=NUMBER OF ACCESSES

NUMBER OF SYMBOLS
=NUMBER OF PARTICIPANTS

SYMBOL COLOR
=ROLE OF PARTICIPANT

DISPLAY DEVICE, SYSTEM, DISPLAY METHOD, AND STORAGE MEDIUM STORING ITS PROGRAM

BACKGROUND OF THE INVENTION

1. Field of the Invention

The present invention relates to a display device, a system, and a display method.

2. Description of the Related Art

Conventionally, a system is proposed which can retrieve interesting videos by reading and reproducing them from a device in which plural videos such as conference videos are stored. In the system, with conference videos and materials on the conference videos stored in a database, responsible personnel notifies prospective people of the existence of conference videos by electronic mail or the like. A person who has received the electronic mail gets a file on the conference videos and conference materials from the database by a personal computer or the like to check their contents, and thereby can determine whether they are interesting conference videos. As Patent References related to such a related art, the following are proposed.

A device described in Japanese Published Unexamined Patent Application No. 2003-87725 stores still images used at the same time as videos synchronously with the videos, displays the still images together with the videos, and reproduces and displays the videos and the still images as if past conferences were actually held, in order that the contents of the conferences can be reviewed.

A device described in Japanese Published Unexamined Patent Application No. 2001-318175 displays events by places and time during scheduling.

However, with the device described in Japanese Published Unexamined Patent Application No. 2003-87725, although videos and still images can be reproduced and displayed as if past conferences were actually held, in order to know what conferences were held in the past, the user must actively search for the conferences or they must be informed by someone else.

With the device described in Japanese Published Unexamined Patent Application No. 2001-318175, future schedules are displayed, but it is impossible to know what conferences were held in the past.

SUMMARY OF THE INVENTION

The present invention has been made in view of the above circumstances and provides a display device, a system, and a display method that enable a quick grasp of the features of conferences held at various points.

The present invention provides a display device. The display device includes an acquiring unit that acquires information about each conference video from a video storage device that stores videos of conferences held at plural points. The display device further includes a display unit that, based on the information about each conference video acquired by the acquiring unit, creates icons representative of features of the conferences held at the points and also creates a table represented on place and time axes, and displays the icons on the table represented on the place and time axes, corresponding to the conferences held at the points. Since icons representative of the features of conferences held at various points are displayed on a table represented on place and time axes, the features of conferences held at various points can be grasped at a glance.

BRIEF DESCRIPTION OF THE DRAWINGS

Embodiments of the present invention will be described in detail based on the following figures, wherein:

FIG. 4 is a flowchart for displaying a conference information bird's eye view;

FIGS. 9A and 9B are drawings showing examples of conference information bird's eye views B4 and B5 in a fourth embodiment;

FIGS. 11A and 11B are drawings for explaining a conference information bird's eye view B7 in a sixth embodiment;

DETAILED DESCRIPTION OF THE EMBODIMENTS

Hereinafter, embodiments of the present invention will be described with reference to the accompanying drawings.

First Embodiment

Figure 1:
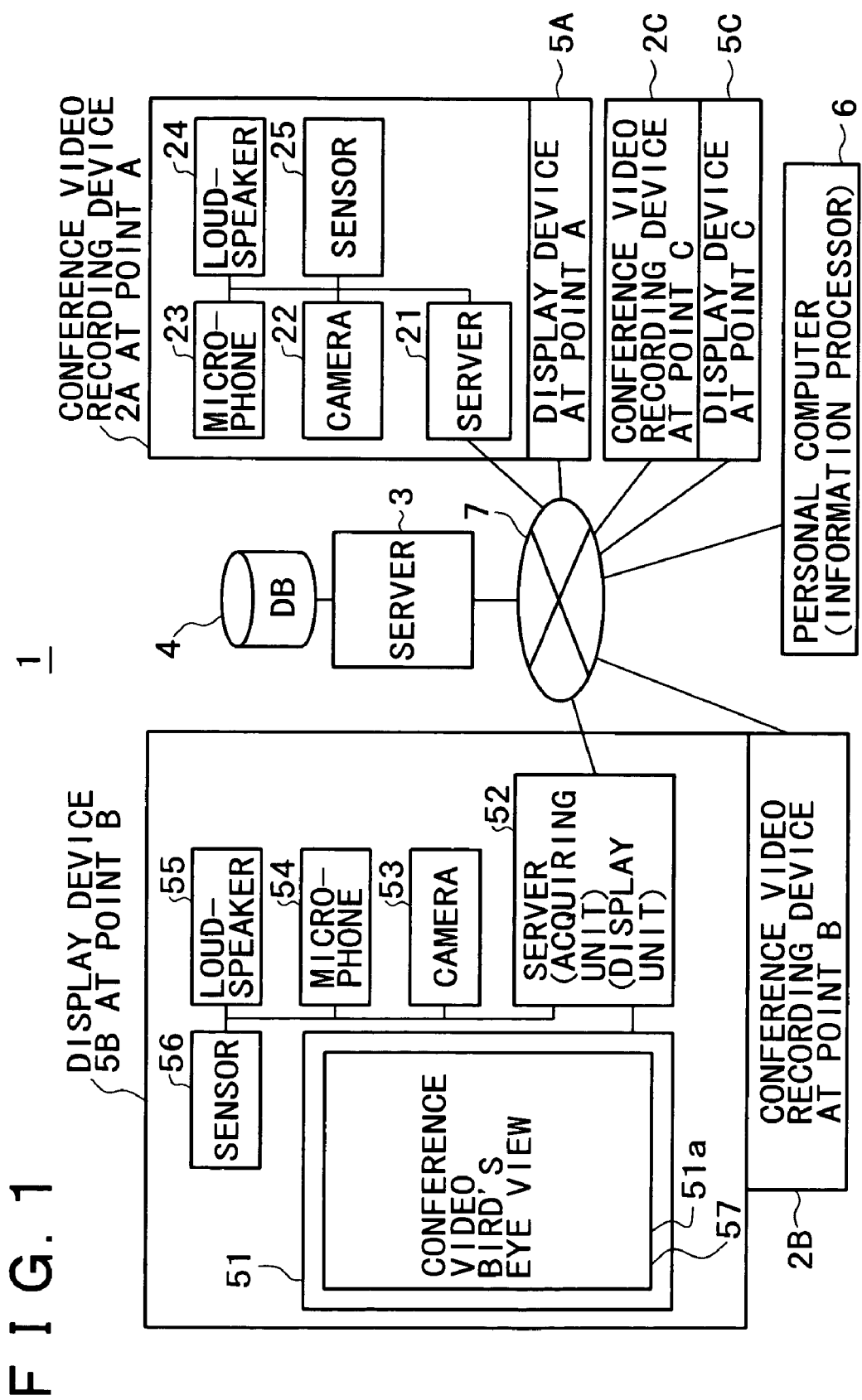
FIG. 1 is an overall configuration diagram of a system according to a first embodiment.

FIG. 1 is an overall configuration diagram of a system according to a first embodiment. As shown in FIG. 1, a system 1 includes conference video recording devices 2A to 2C, a server 3, a database 4, display devices 5A to 5C, and a personal computer 6. The conference video recording devices 2A to 2C are connected over a network 7. The conference video recording devices 2A to 2C record the contents of a conference.

The conference video recording device 2A is placed at a point A, the conference video recording device 2B is placed at a point B, and the conference video recording device C is placed at a point C. The conference video recording device 2A includes a server 21, a camera 22, a microphone 23, a loudspeaker 24, and a sensor 25. Conference video recording devices 2B and 2C have the same configuration as the conference video recording device 2A so that a description of their configuration is omitted.

The server 21 includes a CPU (Central Processing Unit), a RAM (Random Access Memory), a ROM (Read Only Memory), and the like. The server 21 transmits a video produced by recording a conference by the camera 22 and the microphone 23 to the server 3. The server 3 records the conference video sent from the server 21 in the database 4, and distributes information about the conference video in response to requests from display devices 5A to 5C. The database 4 stores conference videos produced at plural points and information relevant to them. One or more of the database 4 may be placed. The network 7 includes, for example, the Internet, LAN (Local Area Network), and WAN (Wide Area Network), and the like.

The display device 5A, the display device 5B, and the display device 5C are placed at points A, B, and C, respectively. The display devices 5A to 5C are placed in different places, corresponding to the conference video recording devices 2A to 2C. The display device 5B includes a display part 51, a server 52, a camera 53, a microphone 54, a loudspeaker 55, a sensor 56, and a touch panel 57. The display devices 5A and 5C have the same configuration as the display device 5B so that a description of their configuration is omitted.

The display part 51 has a screen 51a, and is configured with a large-scale display such as a plasma display. On the screen 51a of the display part 51, a conference video stored in the database 4, a table represented on place and time axes, and icons representative of the features of conferences held at various points are displayed. The display part 51 has the touch panel 57 disposed in a position corresponding to the screen 51a. Viewers can input various commands and messages through the touch panel 57. Information detected by the touch panel 57 is transmitted to the server 52. Although the touch panel 57 is used as an input device here, input devices such as a keyboard and a mouse may be used instead.

The camera 53 is used to photograph viewers of the conference video and the like displayed in the display part 51. The camera 53 includes cameras for photographing still images and moving images. Images photographed by the camera 53 are transmitted to the server 52, and can be registered in the database 4 as annotations in association with the conference video. The microphone 54 acquires viewers voice. Voice from the microphone 54 is transmitted to the server 52, and can be registered in the database 4 as an annotation in association with the conference video. The loudspeaker 55 reproduces voice synchronous with an image displayed by the display part 51.

The sensor 56 detects existence of viewers who exist within a specified area. As the sensor 56, for example, a distance sensor such as an infrared sensor, and a sensor for receiving RFID (Radio Frequency Identification) attached to persons are used. The sensor 56, for example, when the distance between a person and the display part 51 is within N meters, transmits a detection signal to the server 52. The server 52 controls the whole display device 5. The server 52 includes, for example, a CPU, a ROM, a RAM, and the like.

The server 52 acquires information on conference videos from the database 4 in which the videos of conferences held at plural points are stored. Based on the information on the acquired conference videos, it creates icons representative of the features of conferences held at various points, and a table represented on place and time axes, and displays the icons on the table represented on the place and time axes, corresponding to the conferences held at the various points. When an annotation is inputted by handwriting, inputted by the touch panel 57 or the keyboard, inputted by photographing with the camera 53, the annotation is registered in the database 4 in association with the corresponding conference video.

The personal computer 6 is used to view details of the conference videos. For example, it accesses the database 4 by use of the ID of the conference video to receive information about an interesting conference video, and displays the received information on a prescribed display. When an annotation is inputted by handwriting, the keyboard, or video photographing, the personal computer 6 stores the annotation in the database 4 in association with the corresponding conference video. The personal computer 6 identifies an annotation adder by the RFID tag of a person identified by a login ID to the system or a specified sensor. The personal computer 6 stores information about the annotation adder in the database 4 together with the annotation.

Figure 2:
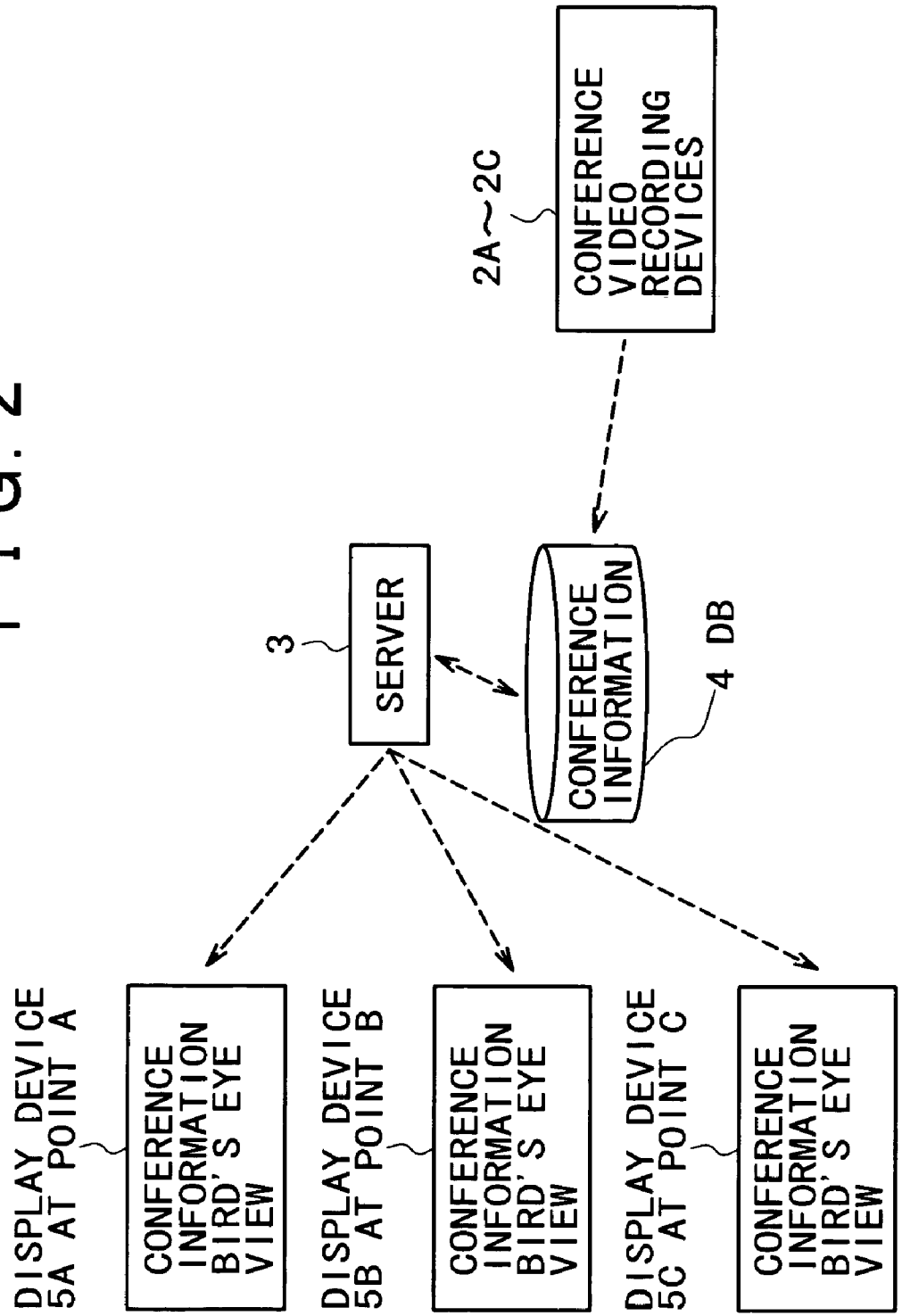
FIG. 2 is a drawing for explaining a summary of processing from registration to display of conference video.

The following summarizes processing from registration to display of a conference video. FIG. 2 shows a summary of processing from registration to display of conference video. As shown in FIG. 2, the conference video recording devices 2A to 2C register conference video and information about it in the database 4. The server 3 distributes the conference video registered in the database 4 and information about it to the display devices 5A to 5C placed at various points. The servers 52 of the display devices 5A to 5C create a conference information bird's eye view based on predetermined feature quantities from the conference video registered in the database 4 and information about it. The conference information bird's eye view may be created in the server 3. The display devices 5A to 5C display the conference information bird's eye view.

Figure 3:
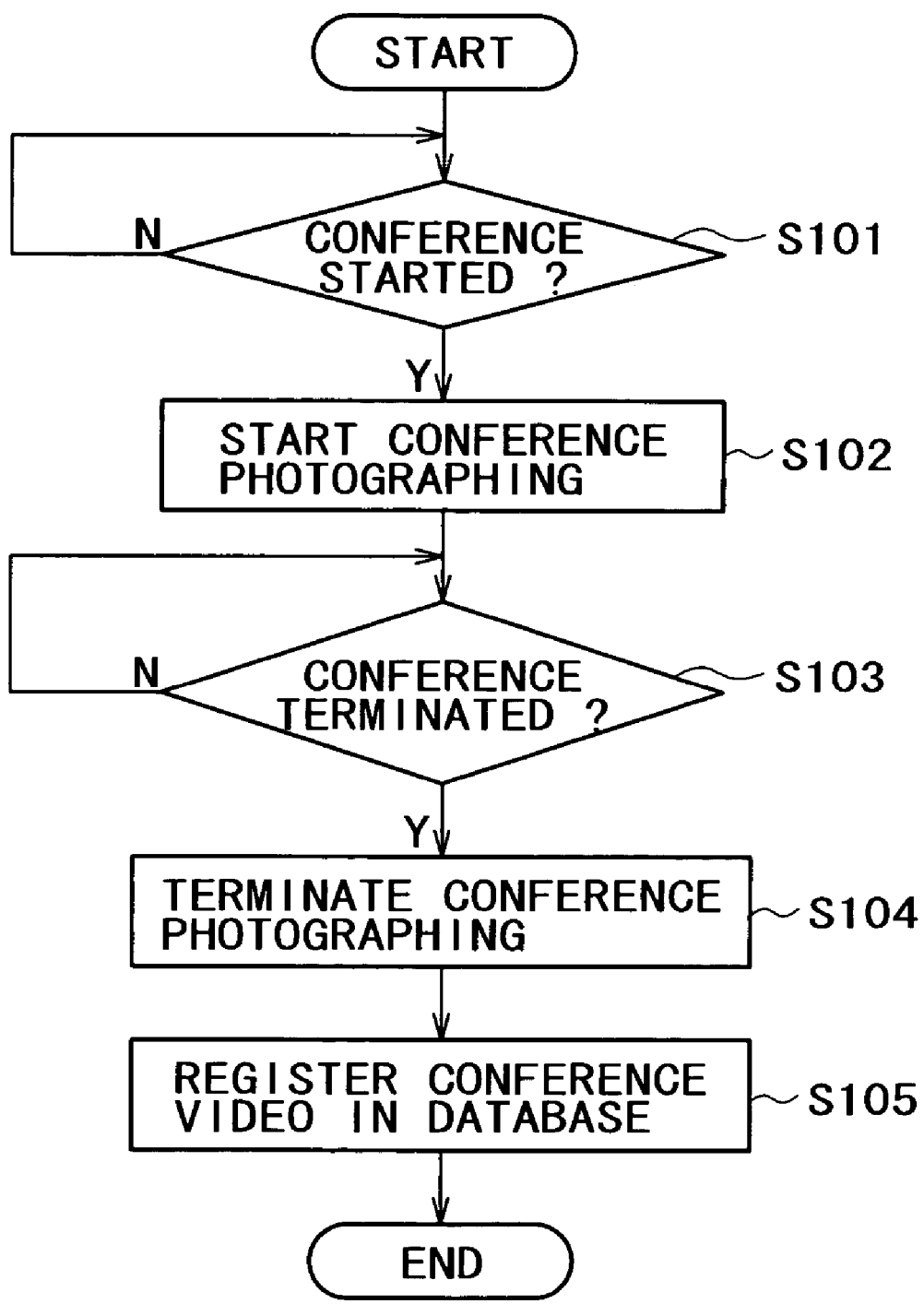
FIG. 3 is a flowchart for registering a conference video.

FIG. 3 is a flowchart for registering a conference video. In Step S101, the conference video recording device 2 determines whether a conference is started, and upon detecting that the conference is started, in Step S102, starts to photograph the conference. In Step S103, the conference video recording device 2 determines whether the conference ends, and upon detecting that the conference ends, in Step S104, terminates photographing the conference. In Step S105, the conference video recording device 2 registers the conference video in the database 4 through the server 3.

When the conference video is recorded in the database 4 in Step S105, the server 21 registers the date when the conference was held, a conference name, information about conference participants, conference materials, and an annotation in association with the conference video. The registration may be automatically made by the conference video recording device 2, or may be manually made by the user. The information about the conference participants contains the names, face pictures, and the like of the conference participants. The correspondences between the names and picture faces of the conference participants may be registered in advance in the database 4.

The conference materials include slides, paper documents and the like. The server 21 can automatically register materials projected onto slides from a projector in a conference room in the database 4. The server 21 may read an ID tag attached to the conference materials by the sensor 25, and capture electronic information of the conference materials from a database (not shown) managing paper documents to register it in the database 4.

When a conference is held, the server 21 automatically registers a conference video in the database 4. In this case, the server 21 determines the start/termination time of the conference by detecting whether a specified switch is on or off by the sensor 25. This switch may be a switch of lights of the conference room. The server 21 detects tags such as RFID attached to persons by the sensor 25, and may determine the start/termination time of the conference by detecting the entrance of the persons to the conference room.

By analyzing a video photographed by the camera 22 placed in the conference room, the server 21 may detect the existence of persons in the conference room and determine the start/termination time of the conference. By analyzing voice collected from the microphone 23 placed in the conference room, the server 21 may detect the existence of persons in the conference room and determine the start/termination time of the conference.

The following describes a method of registering an annotation. The server 21 registers the annotation, a person adding the annotation, and time when the annotation was added, in the database 4 in association with the conference video. The annotation includes, e.g., a hand-written image, video, and a document. The annotation may be registered by the display device 5.

The following describes display processing of a conference information bird's eye view. FIG. 4 is a flowchart for displaying a conference information bird's eye view. In Step S201, the server 52 of the display device 5B detects a request to display a conference information bird's eye view by detecting power on and an operation of the operation part. In Step S202, when the request to display the conference information bird's eye view is made, the server 52 accesses the database 4 through the server 3 to determine whether the conference video is registered.

When determining in Step S203 that the conference video is registered in the database 4, the server 52, in Step S204, acquires information about the conference video from the database 4. In Step S205, based on the information about the conference video acquired from the database 4, the server 52 creates icons representative of the features of conferences held at various points and a table represented on place and time axes. In Step S206, the server 52 displays the icons on the table represented on the place and time axes in the display part 51, corresponding to the conferences held at various points.

Figure 5:
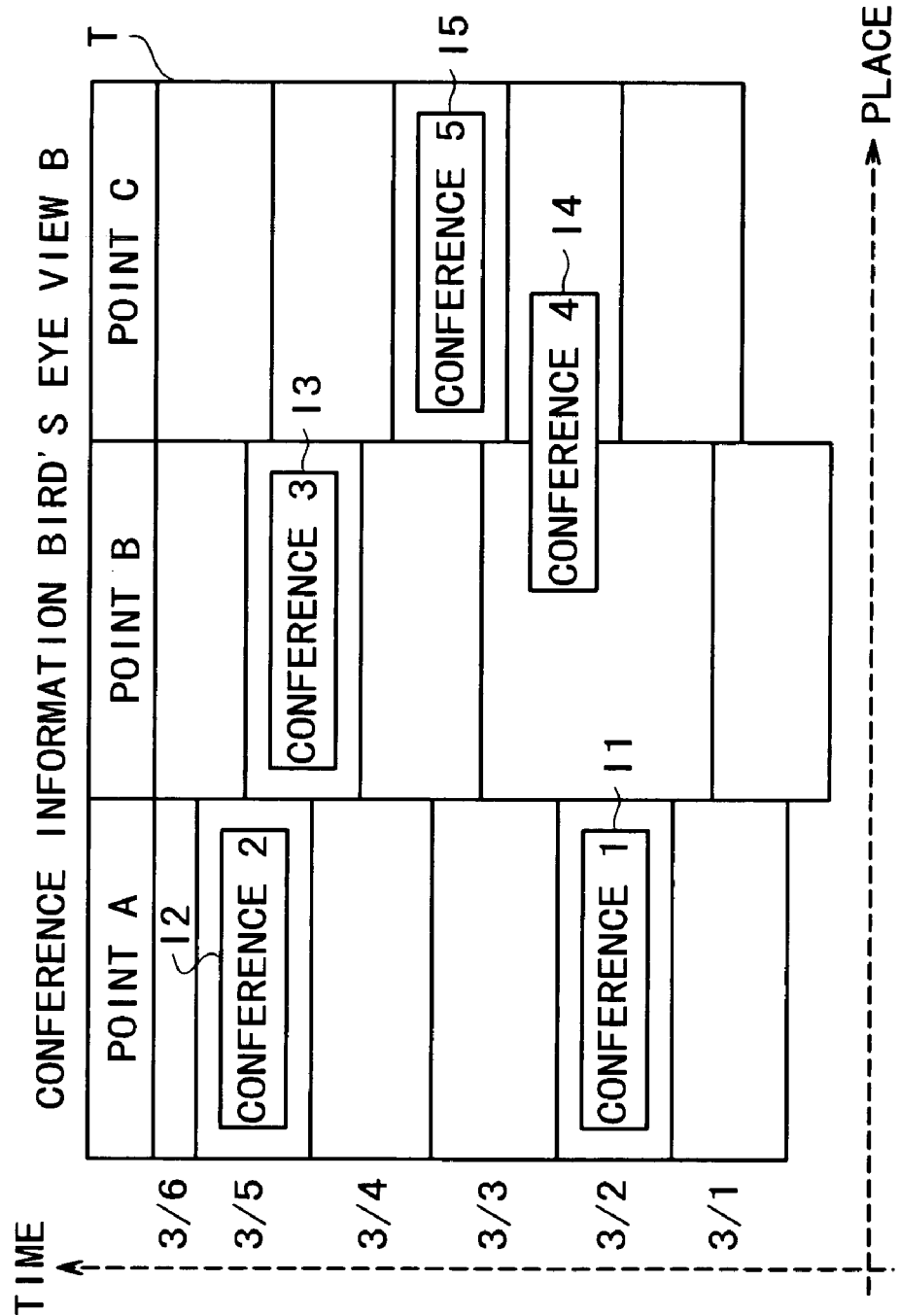
FIG. 5 is a drawing showing a conference information bird's eye view.

FIG. 5 shows a conference information bird's eye view displayed by the display processing. As shown in FIG. 5, in the conference information bird's eye view B, icons I1 to I5 representative of the features of conferences held at various points are displayed on the table T represented on the place and time axes, corresponding to the conferences held at the various points A to C. The icons I1 to I5 are icons representative of the features of the conferences held at the various points.

The icon I4 is an icon for video conference. A video conference is usually held synchronously between points remote from each other. For the conference video on such the conference held at the plural points at the same time, an icon I4 is displayed at the plural points in which the conference was held. By displaying the icon I4 at the plural points in which the conference was held, the points in which the conference was held can be displayed being connected by the icon I4. Thereby, it can be grasped at a glance at which points the conference was held. When the user selects an icon by performing a predetermined operation such as clicking on the icons I1 to I5, the server 52 detects the user-selected icon through the touch panel 57 and displays the conference video. The server 52 represents the time axis of the table T represented on the place and time axes in units of days, weeks, and months.

Figure 6:
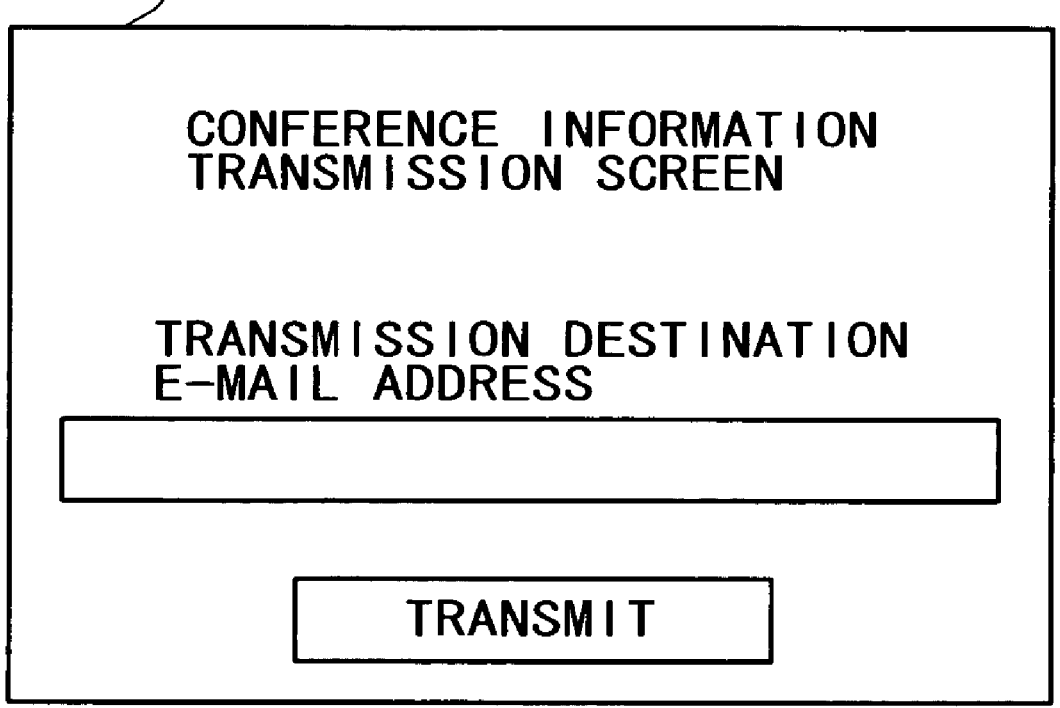
FIG. 6 is a drawing showing a conference information transmission screen C.

The following describes the transmission of conference information to the personal computer 6. The server 52, when displaying the conference information bird's eye view B as shown in FIG. 5, displays the conference information transmission screen C as shown in FIG. 6. Assume that the user finds a noteworthy conference video when viewing the conference information bird's eye view B. To transmit the ID of the noteworthy conference video to his (her) personal computer 6, the user inputs a transmission destination mail address to the conference information transmission screen C through a keyboard (not shown in the figure), and uses the touch panel 57 to press a transmit button. The server 52 sends a request to transmit the conference video ID to the server 3. The server 3 consults the database 4 and sends the conference video ID to the specified personal computer 6. Thereby, by use of the conference video ID sent from the server 3 to access the database 4, the user can view at his (her) leisure an interesting conference video later. For each transmission to the personal computer 6 or each viewing of the conference video on the personal computer 6, a viewing count on the conference corresponding to the conference video ID in the database 4 is incremented by one.

In conventional systems, even if information about conferences (videos, materials, etc.) is registered in a database, since the registered information is only displayed in characters in a display device, it has been impossible to easily determine when, where, and what conferences were held. If a desired conference is to be searched for by a user's inputting the place and name of the conference, the conventional system functions satisfactorily, while when conferences held at various points are to be viewed without having to perform search operations, the function alone is not sufficient.

Especially, when conferences are held at various points and there are time differences among the points, since it is impossible to know a time relationship among the conferences held at the points, to know which of conference A1 at point A and conference B2 at point B was held earlier, a time difference must be considered for calculation. Since a video conference is held among plural points, it is difficult to understand which points are connected during the conference. Moreover, since the importance of conferences is difficult to judge, it is impossible to determine which conferences are referred to by many people and important conferences have sometimes been overlooked.

Since the system of this embodiment displays the conference information bird's eye view B as shown in FIG. 5, the user can recognize conference held times and points, and a connection relationship of video conferences without having to perform special operations. As a result, the user can have more opportunities to recognize the existence of conferences that have not been noticed up to now.

For example, Mr. M who works at point A viewed conferences held at various points by a conference information bird's eye view displayed by the display device 5. He noticed that video conferences were frequently held between points B and C during the last few days. He found that the conferences discussed problems with products sold at the points B and C. Since the same product is sold at the point A, he recognized that the same problem could occur at the point A, and made contact with responsible persons at the points B and C to have the point A participate in the video conferences. Persons at other points noticed by the display device 5 that the point A participated in the conferences at the points B and C, and joined the conferences one after another. As a result, they could quickly share and solve the problems of the product.

Second Embodiment

Figure 7:
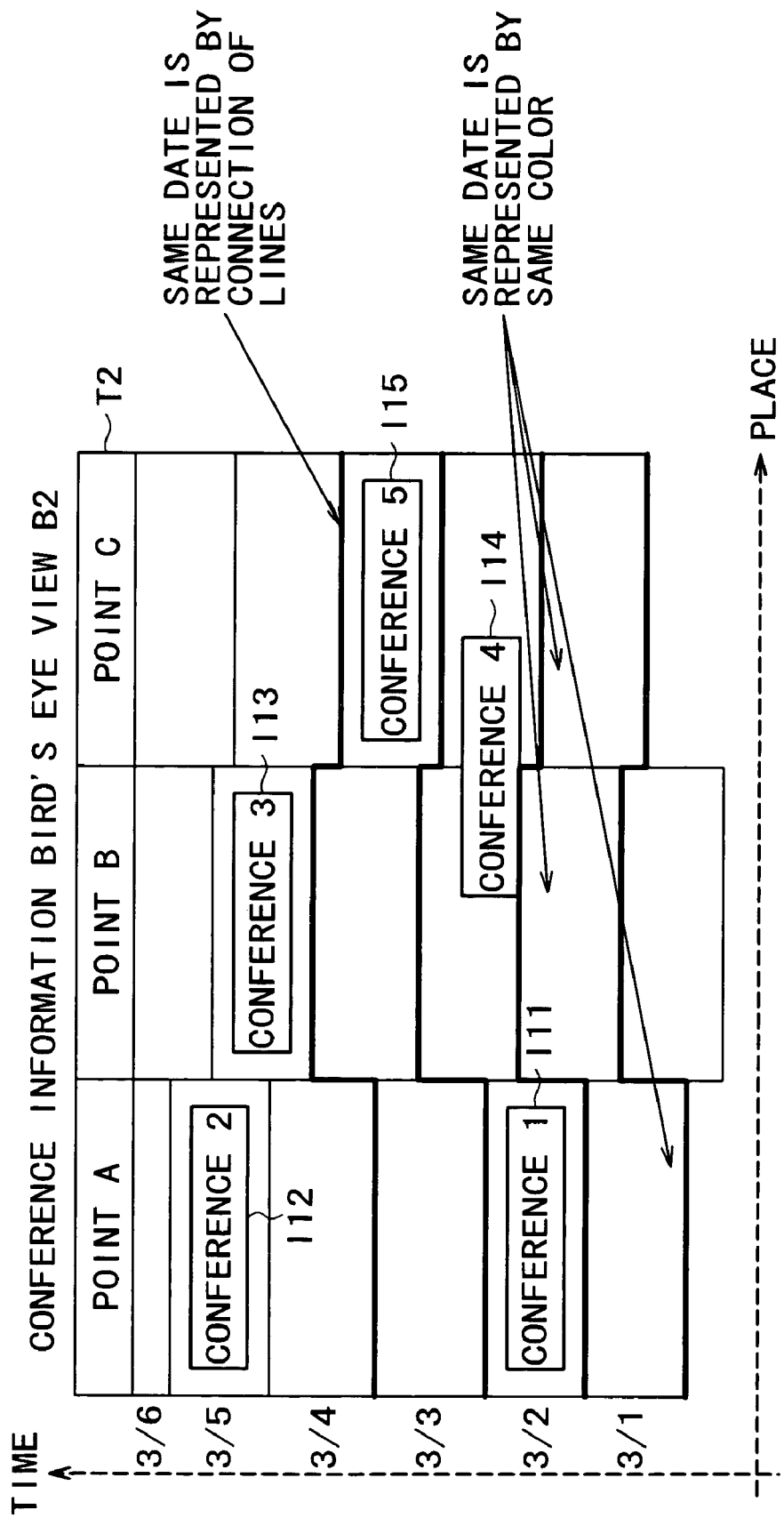
FIG. 7 is a drawing showing another example of a conference information bird's eye view B2 in a second embodiment.

The following describes a second embodiment. In the second embodiment, a variant of the conference information bird's eye view is described. FIG. 7 shows another example of a conference information bird's eye view B2 in the second embodiment. As shown in FIG. 7, in the display of the conference information bird's eye view B2, the server 52 displays icons I11 to I15 representative of the features of conferences held at various points A to C on a table T2 represented on place and time axes, corresponding to the conferences. The server 52 considers time differences among the various points, and displays the table T2 after shifting it by the time differences. The server 52 may represent the same dates among the various points in the table T2 by connections of lines. The server 52 may represent the same dates among the various points in the table T2 by the same colors.

According to the second embodiment, even if there are time differences among the various points, it can be grasped at a glance at which points and when conferences were held.

Third Embodiment

Figure 8:
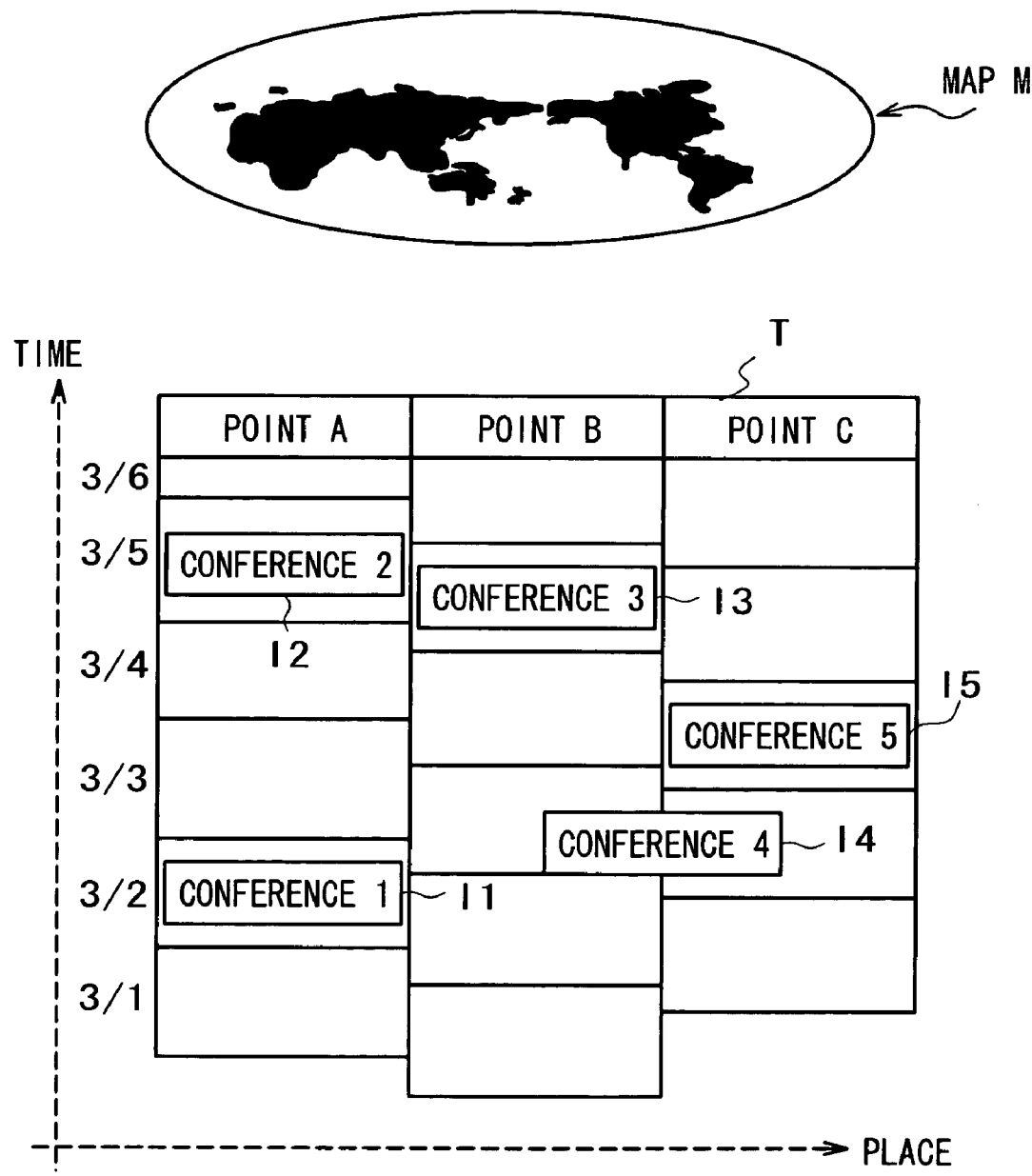
FIG. 8 is a drawing showing another example of a conference information bird's eye view in a third embodiment.

The following describes a third embodiment. In the third embodiment, a variant of the conference information bird's eye view is described. FIG. 8 shows another example of the conference information bird's eye view in the third embodiment. As shown in FIG. 8, in the display of the conference information bird's eye view B3, the server 52 displays icons I1 to I5 representative of the features of conferences held at various points A, B, and C on a table T represented on place and time axes, corresponding to the conferences. The server 52 displays a map M having correspondences with the various points A, B, and C at which the conferences were held.

According to the third embodiment, the map M is displayed to show correspondences with the points at which the conferences were held so that the places of the points can be identified. The points at which the conferences were held can be intuitively grasped.

Fourth Embodiment

The following describes a fourth embodiment. In the fourth embodiment, a variant of the conference information bird's eye view is described. FIGS. 9A and 9B show examples of conference information bird's eye views B4 and B5, wherein FIG. 9A shows a display example of a display device 5B placed at point B, and FIG. 9B shows a display example of a display device 5A placed at point A. As shown in FIG. 9A, in the display of the conference information bird's eye view B4, the server 52 displays icons I31 to I35 representative of the features of conferences held at various points A, B, and C on a table T4 represented on place and time axes, corresponding to the conferences.

The server 52 displays the table T4 represented on place and time axes, centering on the point B displayed in the display device 5B. This provides a display easy to view to viewers. As shown in FIG. 9B, in the display of the conference information bird's eye view B5, the server 52 displays icons I41 to I45 representative of the features of conferences held at various points A, B, and C on a table T5 represented on place and time axes, corresponding to the conferences.

The server 52 displays a table T5 represented on place and time axes, centering on the point A displayed in the display device 5A. This provides an easy-to-see display to viewers. When the conference video is a video on a conference (e.g., a video conference) which was held at multiple points at the same time, and the points B and C are distant from each other in a table represented on place and time axes and cannot be displayed by one icon, the server 52 divides the icon to icons I44a and I44b and displays them on the table T5 represented on the place and time axes. The order of the display can be manually changed.

According to the fourth embodiment, even when points are distant from each other on the table, a conference held at the points can be grasped at a glance.

Fifth Embodiment

Figure 10A:
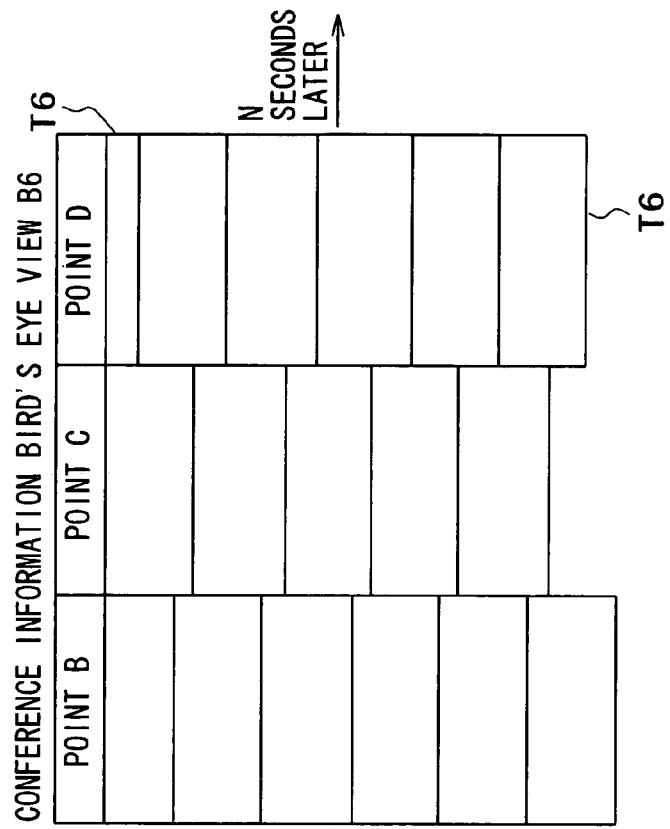
FIGS. 10A and 10B are drawings for explaining a conference information bird's eye view B6 in a fifth embodiment.
Figure 10B:
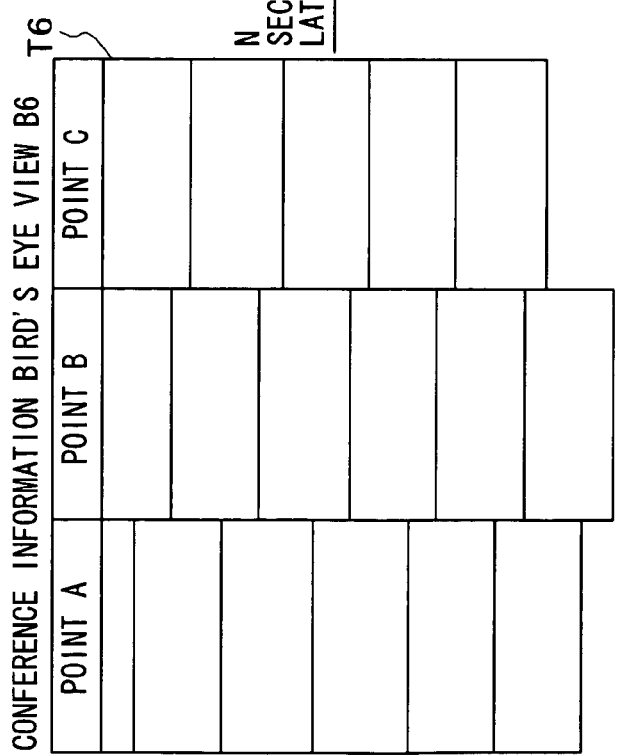

The following describes a fifth embodiment. FIGS. 10A and 10B are drawings for explaining a conference information bird's eye view B6 in the fifth embodiment, wherein FIG. 10A shows an initial state of the conference information bird's eye view B6, and FIG. 10B shows the conference information bird's eye view B6 when N seconds have elapsed. In the initial state, the server 52 displays a table T6 represented on the place and time axes shown in FIG. 10A. When a conference was held at too many points, not all the points may be displayed at a time.

In such a case, the server 52, as shown in FIG. 10B, moves and displays points in the table T6 represented on the place and time axes in the direction of the place axis. Specifically, the server 52 initially displays the table T6 containing the points A, B, and C, then N seconds later, shifts the points in the right direction to display the table T6 containing the points B, C, and D, another N seconds later, shifts the points in the right direction to display the table T6 containing the points C, D, and E, and still another N seconds later, shifts the points in the right direction to display the table T6 containing the points D, E, and F. In such displays, points displayed automatically change without user's operations, but points to be displayed may be selected by user's operations.

According to the fifth embodiment, by successively moving and displaying the points in the table represented on the place and time axes in the direction of the time axis, even when plural points cannot be displayed on one screen, conferences held at the points can be grasped at a glance.

Sixth Embodiment

The following describes a sixth embodiment. FIGS. 11A and 11B are drawings for explaining a conference information bird's eye view B7 in the sixth embodiment, wherein FIG. 11A shows an initial state of the conference information bird's eye view B7, and FIG. 11B shows the conference information bird's eye view B7 when N seconds have elapsed. The conference information bird's eye view B7 of FIG. 11 is displayed in the display device 5B placed at the point B. In FIG. 11, icons are omitted for simplicity.

In the initial state, the server 52 displays a table T7 represented on the place and time axes shown in FIG. 11A. When a conference was held at too many points, not all the points may be displayed at a time. In such a case, as shown in FIG. 11B, the server 52 displays the points in the table 7 represented on the place and time axes in a way that does not move the point B being displayed in the table but moves other points in the direction of the place axis. Specifically, the server 52 initially displays the points A and C with the point B sandwiched between them, and N seconds later, displays the points C and D with the point B sandwiched between them, another N seconds later, displays the points D and E with the point B sandwiched between them. In this way, in the display device 5B placed at the point B, with the point B always centered, right and left points are successively slid to be displayed. Points to be displayed can be manually selected. Also, points to be fixed can be manually or automatically selected.

According to the sixth embodiment, with a specific point always displayed centrally, by shifting points to be displayed per given time like a slide show, even when plural points cannot be displayed on one screen, a conference held at the points can be grasped at a glance.

Seventh Embodiment

Figure 12:
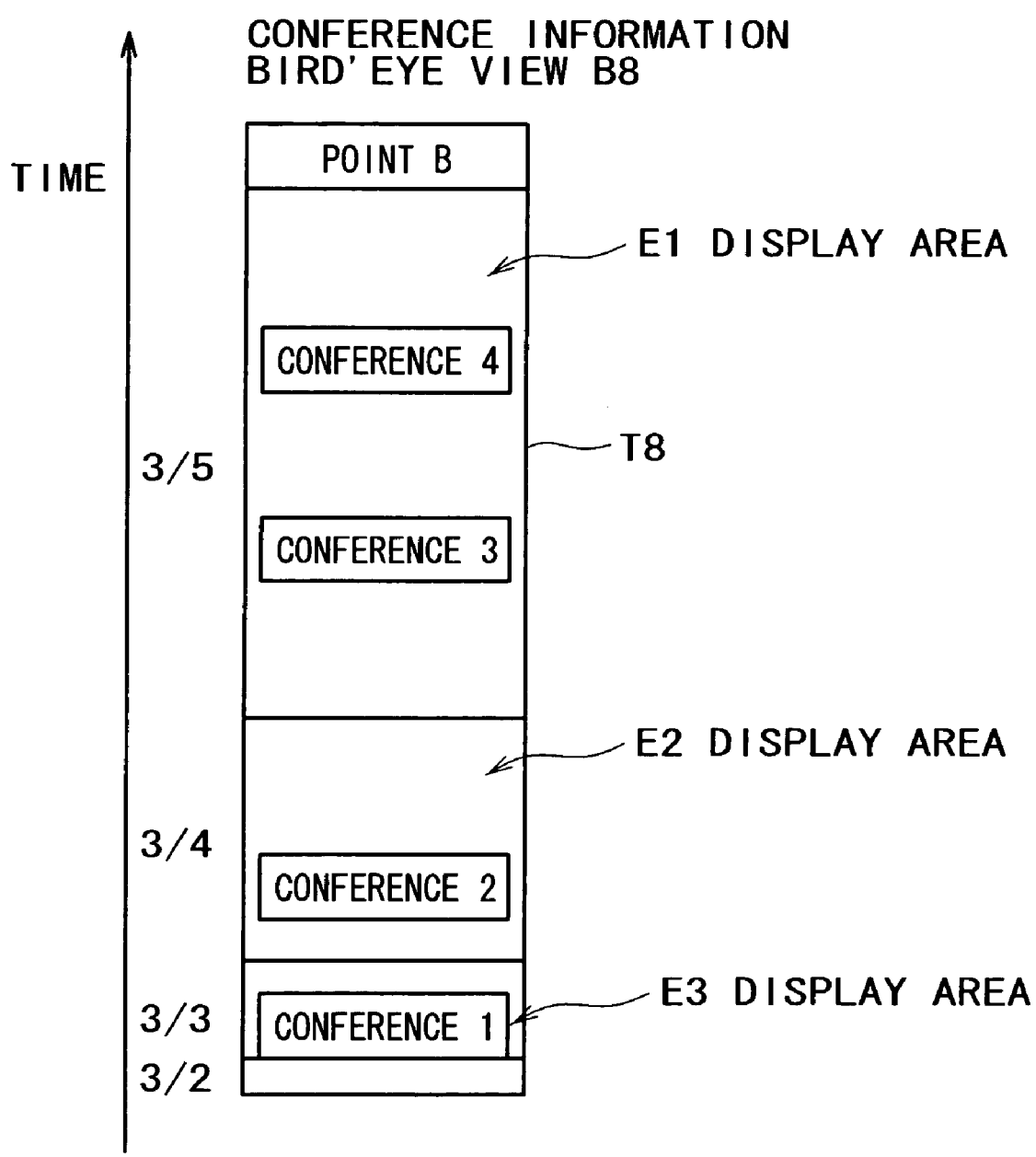
FIG. 12 is a drawing for explaining a conference bird's eye view B8 in a seventh embodiment.

The following describes a seventh embodiment. FIG. 12 is a drawing for explaining a conference bird's eye view B8 in the seventh embodiment. In FIG. 12, other points are omitted for simplicity. Not all the icons to be displayed may be displayed due to a restriction on a display area. In such a case, as shown in FIG. 11, the server 52 non-linearly displays a table T8 represented on the place and time axes in the direction of the time axis to reduce the number of the icons to be displayed according to a display area. In FIG. 12, the time axis is displayed with the logarithm axis to display more of recent conferences in more detail. Accordingly, display areas are allocated so that the following relationship is satisfied: display area E1>display area E2>display area E3. The server 52 selects icons to be displayed, using amounts of the features of conferences according to the display areas. The time axis may be displayed in units of weeks. The display may be changed in units of months or days.

According to the seventh embodiment, by non-linearly displaying the time axis, for example, many of recent conference videos can be displayed.

Eighth Embodiment

Figure 13:
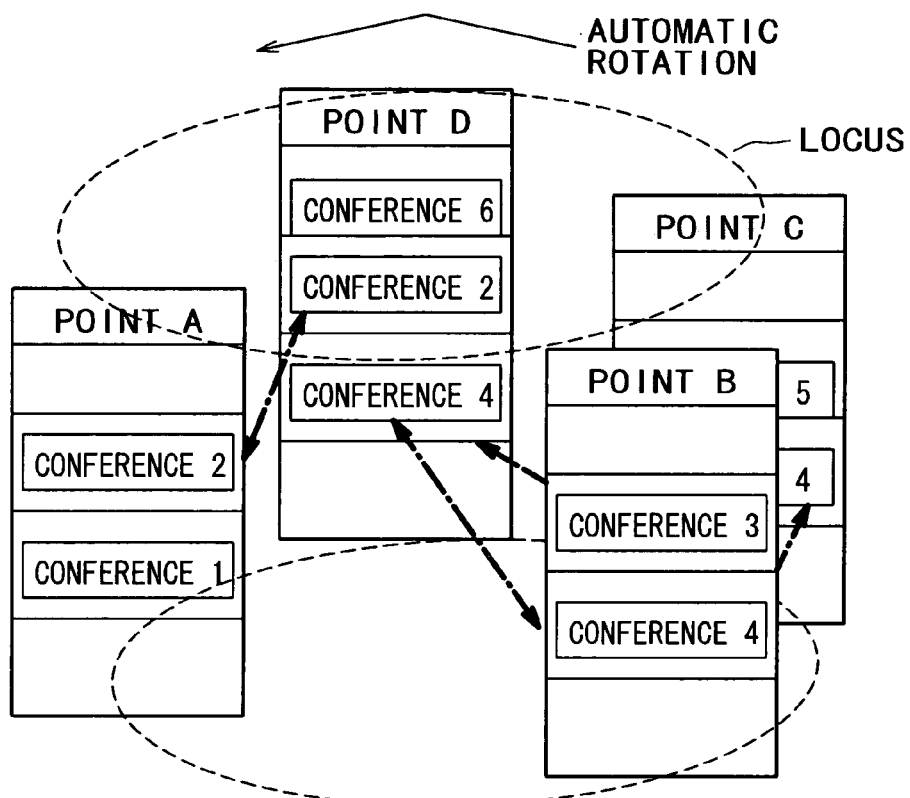
FIG. 13 is a drawing for explaining a conference information bird's eye view B9 in an eighth embodiment.

The following describes an eighth embodiment. A conference bird's eye view in the eighth embodiment is displayed in three dimensions unlike the abovementioned embodiments of two-dimensional display. FIG. 13 is a drawing for explaining a conference information bird's eye view B9 in the eighth embodiment. As shown in FIG. 13, the server 52 splits and displays a table represented on the place and time axes on a three-dimensional space. The server 52 rotatably displays the table represented on the place and time space along proper loci. The server 52 connects relations of a video conference by lines to show at which points the video conference was held. The rotation may be automatically made or by a user's operation. Although FIG. 13 shows a view from an oblique upper direction, viewpoints may be changed by performing predetermined operations.

According to the eighth embodiment, more points can be displayed on a three-dimensional space. Hidden portions can be revealed by rotation.

Ninth Embodiment

The following describes a ninth embodiment. In the ninth embodiment, a method of representing icons is described. The server 52 calculates feature quantities from conference information in the database 4 and represents icons according to the feature quantities. The server 52 represents the icons by changing the number and colors of symbols in the icons according to the feature quantities.

The feature quantities include information indicative of the features of a conference such as information about conference participants, the number of references to a conference video, the places where the conference video was accessed, the rolls of persons who accessed the conference video, information about annotations, the length of the conference video, contents quantities, a conference style such as lecture/discussion, the behavior and/or the contribution of the participants, the magnitude of behavior of the participants in the conference video, and the loudness of voices of conference participants. The user may change or combine the feature quantities, or calculate feature quantities by a new calculation method. The number of references to the conference video and the places where the conference video was accessed can be acquired by access logs or the like. The magnitude of behavior of conference participants in the conference video, and the loudness of voices of conference participants can be calculated by subjecting the conference video to signal processing technology such as image processing and voice signal processing. The server 52 may use the number of persons who actually participated in the conference plus (the number of persons watching the conference video multiplied by video replay time) as a new feature quantity.

For example, the server 52 represents an icon as described below. The server 52 represents an icon according to the number of accesses to a conference video stored in the database 4. The server 52 represents an icon by changing a background color of the icon according to the number of references to the conference video. The server 52 represents an icon by changing a symbol according to the place where conference information was accessed and the role of a person who accessed it. The server 52 represents an icon according to the number of participants in a conference. Thereby, the number of participants can be grasped at a glance by the icon. For example, the number of conference participants is represented by the number of symbols.

The server 52 represents an icon by changing the color of a symbol indicating a conference participant according to the attribute of the participant. Thereby, the importance of conference can be grasped at a glance by viewing the attribute of conference participant. The server 52 represents an icon according to the existence of the annotation added to conference video. Thereby, it can be grasped at a glance by the icon whether an annotation is added to the conference video. The quantity of annotation added to each conference, and the role of a person who added it may be represented by symbols. The server 52 may represent a conference style, the magnitude of behavior in video, and the loudness of voice by symbols.

Figure 14A:
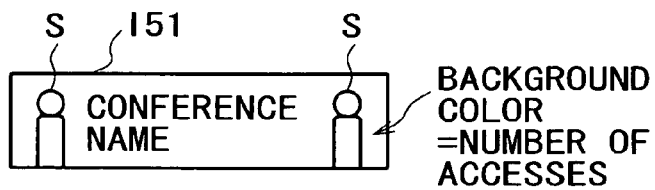
FIGS. 14A and 14B are drawings showing examples of representing an icon according to feature quantities of conference.
Figure 14B:
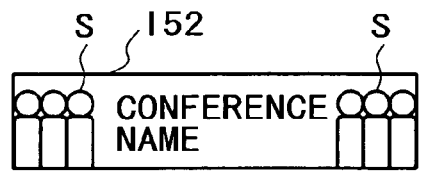

FIGS. 14A and 14B show examples of representing an icon according to the feature quantities of conference. In icon I51 shown in FIG. 14A, a conference name and participant symbols S at each end of the conference name are displayed, the participant symbols S being produced according to the number of participants in the conference. In this example, it is grasped at a glance that two people participated in the conference. In icon I52 shown in FIG. 14B, a conference name and participant symbols S at each end of the conference name are displayed, the participant symbols S being produced according to the number of participants in the conference. In this example, it is grasped at a glance that six people participated in the conference. Thereby, a glance of the icons tells conferences frequently accessed, conferences having many participants, and conferences having participants of high ranks.

According to the ninth embodiment, since icons are represented according to the features of conferences, the importance of the conferences can be grasped at a glance.

In the abovementioned embodiments, icons and tables are created by the server 52 within the display device 5. However, the icons and tables may be created by the server 3. When the server 3 connected with the database 4 performs calculations, feature quantities may be shared at all points. When feature quantities are calculated at each point as in the abovementioned embodiments, different calculation methods may be used at different points. For example, when the conference is low value at point A, a multiplication weight may be lowered during calculation. Also, for access from the point A, a weight three times higher than that at normal time may be multiplied per access.

According to the abovementioned embodiments, since the features of past conferences held in several places are displayed by icons on a place-and-time space, it can be grasped at a glance when and where the past conferences were held. Also, the importance of the conferences can be grasped at a glance. Important conferences can be shared among users.

The horizontal axis represents points in the abovementioned tables, but may represent not physical points but collections of people such as groups and project teams, that is, collections such as group A, group B, and group C instead of points A, B, and C. The groups include an intelligent property group, a development group, and the like. The definition of each group and figures included in the group are stored in a database. The abovementioned conference video bird's eye views are updated periodically as well as when a new conference video is registered. The server 52 corresponds to an acquiring unit and a display unit in the patent claims. The database 4, the personal computer 6, and the touch panel 57 correspond to a video storage device, an information processor, and a selection unit in the patent claims, respectively.

Hereinbefore, embodiments of the present invention have been described in detail. The present invention is not limited to such specific embodiments and may be modified and changed in various ways within the spirit and scope of the present invention described in the patent claims.

As described above, In an embodiment of the invention includes an acquiring unit that acquires information about a conference from a storage device that stores conferences information. Also, the invention includes a display unit that, based on the information acquired by the acquiring unit, creates icon which is representative of a feature of the conference and a table represented on place and time axes or the like, and displays the icon on the table represented on the place and time axes, corresponding to the conferences.

Although the present invention has been shown and described place and time axes as predetermined axes, various changes and modifications will be apparent those skilled in the art, for example, information of a person who is related to the conference and a place where the conference is held or the like. It can take at least one of information of a person, a place, time, contents of the conference and so on as an axis. Moreover, the present invention has been shown and described information of a conference however it is not to be considered limited to the conference and it also includes an event which people wants to know the contents of it.

In an embodiment, Since icons being representative of the features of conferences held at various points are displayed on a table represented on place and time axes, the features of conferences held at various points can be grasped at a glance.

The display unit may display a conference video corresponding to one of the icons selected by a predetermined operation. By displaying a conference video corresponding to a selected icon, an interesting conference video can be immediately viewed.

The display unit may display an operation screen for transmitting the information about the conference video to a predetermined information processor. By operating the operation screen for transmitting information about a conference video to the information processor, information about an interesting conference video can be sent to the information processor. Thereby, an interesting conference video can be viewed at his (her) leisure later.

The display unit may display a map having correspondences with the points at which the conference was held. Since a map having correspondences with the points at which conferences were held is displayed, it can be grasped at a glance at which points the conferences were held.

The display unit may display a table represented on the place and time axes, taking time differences of the points into account. The dates when conferences were held can be grasped at a glance.

The display unit may display the same dates among the points in the table represented on the place and time axes in the same colors. Dates when conferences were held can be grasped without being confused by time differences.

The display unit may display the same dates among the points in the table represented on the place and time axes by connections of lines. Dates when conferences were held can be grasped without being confused by time differences.

The display unit may display the table represented on the place and time axes, centering on a point being displayed. Since a table represented on the place and time axes is displayed centering on a point being displayed, an easy-to-see display can be provided to viewers.

The display unit may move and display the points in the table represented on the place and time axes in a direction of the place axis. Since points in a table represented on place and time axes are moved and displayed in the direction of a place axis, even when plural points cannot be displayed on one screen, conferences held at the points can be grasped without the user's performing specific operations.

The display unit may display the points in the table represented on the place and time axes without moving points being displayed in the table but with moving other points in the direction of the place axis. Since points being displayed in a table represented on the place and time axes are not moved but other points are successively moved and displayed, a display can be made with a viewer centered.

The display unit may represent the time axis of the table represented on the place and time axes in one of day unit, week unit, and month unit. The time axis of a table represented on the place and time axes can be displayed in units of days, weeks, or months so that conferences held at various points can be grasped in different time scales.

The display unit may non-linearly display a direction of the time axis of the table represented on the place and time axes. By non-linearly displaying the time axis direction, many of recent conference videos can be displayed, for example.

The display unit may display the table represented on the place and time axes on a three-dimensional space. Many points can be displayed at a time on the three-dimensional space.

The display unit may rotatably display the table represented on the place and time space along proper loci. Since a table represented on the place and time space is rotatably displayed along proper loci, hidden portions can be revealed.

When the conference video is a video on a conference held at multiple points at the same time, the display unit may display the icon on plural points in the table represented on the place and time axes, the conference having been held at the plural points. It can be grasped at a glance at which points the conference was held.

When the conference video is a video on a conference which was held at multiple points at the same time, and the points are distant from each other in the table represented on the place and time axes, the display unit may divide the icon and displays resultant icons on the table represented on the place and time axes. A conference held at different points distant from each other in the table can be grasped at a glance.

The display device may further include a calculating unit that calculates feature quantities of each conference based on the information about each of the conference videos acquired by the acquiring unit, and the display unit may represent the icon based on the feature quantities of each of the conferences. By representing an icon based on feature quantities of each conference, the features of conferences held at various points can be grasped at a glance.

The feature quantities of each of the conferences may include at least one of information about conference participants, the number of references to a conference video, places where the conference video was accessed, information about persons who accessed the conference video, information about annotations, a length of the conference video, contents quantities, a conference style, a magnitude of behavior of the conference participants, and loudness of voices of the conference participants.

The display unit may represent the icon according to the number of references to one of the conference videos stored in the video storage device. The number of references to conference videos can be grasped at a glance by the icon.

The display unit may represent the icon by changing a background color of the icon according to the number of references to the conference video. The number of accesses to conference videos can be recognized by the background colors of the icons.

The display unit may represent the icon according to the number of participants in the conference. The number of participants can be grasped at a glance by the icon.

The display unit may represent the icon by changing a color of a symbol representative of the conference participants according to an attribute of the conference participants. The number of conference participants can be grasped at a glance by the icon.

The display unit may represent the icon according to existence of an annotation attached to the conference video. Whether an annotation is attached to a conference video can be grasped at a glance.

Another embodiment of the present invention may be a system includes a video storage device that stores videos of conferences held at plural points; an information processor that receives information about the videos; a selection unit that selects icons displayed on place and time axes; and the display device described above. Since icons representative of the features of conferences held at various points are displayed on place and time axes, a system can be provided which enables a quick grasp of conferences held at various points.

Another embodiment of the present invention may be a display method includes: an acquiring step of acquiring information about each conference video from a video storage device that stores videos of conferences held at plural points; a step of, based on information about each conference video acquired by the acquiring step, creating icons representative of features of the conferences held at the points and a table represented on place and time axes; and a display step of displaying the icons on the table represented on the place and time axes, corresponding to the conferences held at the points. Since icons representative of the features of conferences held at various points are displayed on place and time axes, the features of conferences held at various points can be grasped at a glance.

According to the present invention, a display device, a system, and a display method can be provided which enables a quick grasp of the features of conferences held at various points.

Although the present invention has been shown and described with reference to a specific embodiment, various changes and modifications will be apparent to those skilled in the art from the teachings herein. Such changes and modifications as are obvious are deemed to come within the spirit, scope and contemplation of the invention as defined in the appended claims.

Also, The entire disclosure of Japanese Patent Application No. 2004-174858 filed on Jun. 11, 2004 including specification, claims, drawings and abstract is incorporated herein by reference in its entirety.

What is claimed is:

1. A display device comprising:
    an acquiring unit that acquires information about a conference from a storage device that stores conference information;
    a display unit that creates an icon being representative of a feature of the conference and a table represented on predetermined axes, and displays the icon on the table corresponding to the conference, based on the information acquired by the acquiring unit; and
    a calculating unit that calculates feature quantities of the conference based on the information acquired by the acquiring unit,
    wherein the display unit represents the icon based on the feature quantities of the conference.

2. The display device according to claim 1, the information acquired by the acquiring unit is a conference video.

3. The display device according to claim 1, the conference information stored in the storage device is information of conferences held at a plurality of points.

4. The display device according to claim 1, wherein the display unit displays the information corresponding to the icon selected by a predetermined operation.

5. The display device according to claim 1, wherein the display unit displays an operation screen for transmitting the information about the conference to an information processor.

6. The display device according to claim 1, wherein the display unit displays a map corresponding to a point which the conference is held.

7. The display device according to claim 1, wherein the display unit displays the same dates among the points in the table in the same colors.

8. The display device according to claim 1, wherein the display unit displays the same dates among the points in the table by connections of lines.

9. The display device according to claim 1, wherein the display unit displays the table centering on a point being displayed.

10. The display device according to claim 1, wherein the display unit displays a point in the table by moving the point in a direction of the one axis.

11. The display device according to claim 10, wherein the display unit displays the points in the table without moving the points being displayed in the table but with moving other points in the direction of the one axis.

12. The display device according to claim 1, wherein the display unit displays the table on a three-dimensional space.

13. The display device according to claim 12, wherein the display unit displays the table by rotating the table along a proper loci.

14. The display device according to claim 1, wherein, when the information about the conference is a video about the conference which was held at multiple points at the same time, the display unit displays the icon on a plurality of points in the table represented on the place and time axes, the conference having been held at the plurality of points.

15. The display device according to claim 1, wherein, when the information about the conference is a video about the conference which was held at multiple points at the same time and the points are distant from each other in the table, the display unit divides the icon and displays the resultant icons on the table.

16. The display device according to claim 1, wherein the feature quantities of each of the conferences include at least one of information about a conference participant, the number of references to a conference video, a place where the conference video was accessed, information about a person who accessed the conference video, information about an annotation, a length of the conference video, contents quantities, a conference style, a magnitude of behavior of the conference participant, and loudness of voice of the conference participant.

17. The display device according to claim 1, wherein the display unit represents the icon by changing a color of a symbol being representative of the conference participant based on an attribute of the conference participant.

18. The display device according to claim 1, wherein the display unit represents the icon according to existence of an annotation attached to the information.

19. A display device comprising:
an acquiring unit that acquires information about a conference from a storage device that stores conference information; and
a display unit that creates an icon being representative of a feature of the conference and a table represented on predetermined axes, and displays the icon on the table corresponding to the conference, based on the information acquired by the acquiring unit,
wherein the display unit displays a table represented on place and time axes, taking time differences of a plurality of points at which a plurality of conferences are held into account.

20. A display device comprising:
an acquiring unit that acquires information about a conference from a storage device that stores conference information; and
a display unit that creates an icon being representative of a feature of the conference and a table represented on predetermined axes, and displays the icon on the table corresponding to the conference, based on the information acquired by the acquiring unit,
wherein the display unit represents the icon according to the number of references to one of the conference information stored in the storage device.

21. The display device according to claim 20, wherein the display unit represents the icon by changing a color of the icon or a background color of the icon according to the number of references to the conference information.

22. A display device comprising:
an acquiring unit that acquires information about a conference from a storage device that stores conference information; and
a display unit that creates an icon being representative of a feature of the conference and a table represented on predetermined axes, and displays the icon on the table corresponding to the conference, based on the information acquired by the acquiring unit,
wherein the display unit represents the icon according to a number of participants in the conference.

23. A system comprising:
a storage device that stores conference information;
an information processor that receives the conference information;
a selection unit that selects icons displayed on a table; and
a display device comprising:
an acquiring unit that acquires information about a conference from a storage device that stores conference information;
a display unit that creates an icon being representative of a feature of the conference and a table, and displays the icon on the table corresponding to the conference, based on the information acquired by the acquiring unit; and
a calculating unit that calculates feature quantities of the conference based on the information acquired by the acquiring unit,
wherein the display unit represents the icon based on the feature quantities of the conference.

24. A display method comprising:
acquiring information about a conference from a storage device that stores conference information;
calculating feature quantities of the conference based on the information acquired;
creating an icon being representative of the calculated feature quantities of the conference;
creating a table; and
displaying the icon on the table corresponding to the conference,
wherein a process of creating the icon and the table is performed based on the information acquired.

25. A storage medium readable by a computer, the storage medium storing a program of instructions executable by the computer to perform a function for displaying comprising:
acquiring information about a conference from a storage device that stores conference information;
calculating feature quantities of the conference based on the information acquired;
creating an icon being representative of the calculated feature quantities of the conference, based on the information acquired;
creating a table based on the information acquired; and
displaying the icon on the table corresponding to the conference.

26. A display device comprising:
an acquiring unit that acquires information about an event from a database;
a create unit that creates an icon being representative of the information and a table represented on an event and time axes based on the information acquired by the acquiring unit;
a display unit that displays the icon on the table corresponding to the event; and
a calculating unit that calculates feature quantities of the event based on the information acquired by the acquiring unit,
wherein the create unit creates the icon based on the feature quantities of the event.

27. A display device comprising:
an acquiring unit that acquires information about a storage device that stores conference information;
a display unit that creates an icon being representative of a feature of the conference and a table represented on predetermined axes, and displays the icon on the table corresponding to the conference, based on the information acquired by the acquiring unit; wherein
the predetermined axes are for time and a place in which the conference has been held.

* * * * *